(12) United States Patent
Keates et al.

(10) Patent No.: US 10,186,735 B2
(45) Date of Patent: Jan. 22, 2019

(54) VOID FILLING BATTERY

(71) Applicant: INTEL CORPORATION, Santa Clara, CA (US)

(72) Inventors: Andrew W. Keates, Los Gatos, CA (US); Naoki Matsumura, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 371 days.

(21) Appl. No.: 14/977,093

(22) Filed: Dec. 21, 2015

(65) Prior Publication Data

US 2017/0179539 A1  Jun. 22, 2017

(51) Int. Cl.
*H01M 10/42* (2006.01)
*H01M 10/04* (2006.01)
*H01M 10/0525* (2010.01)
*H01M 2/10* (2006.01)
*H01M 6/40* (2006.01)
*H01M 4/36* (2006.01)
*H01M 4/02* (2006.01)

(52) U.S. Cl.
CPC ....... *H01M 10/425* (2013.01); *H01M 2/1066* (2013.01); *H01M 6/40* (2013.01); *H01M 10/0436* (2013.01); *H01M 10/0525* (2013.01); *H01M 4/366* (2013.01); *H01M 2004/021* (2013.01); *H01M 2220/30* (2013.01)

(58) Field of Classification Search
CPC ...... H05K 1/0284; H05K 1/144; H05K 1/145; H05K 1/18; H05K 1/181; H05K 1/182; H05K 1/185; H01M 10/425; H01M 10/4257; H01M 10/4264; H01M 10/0436; H01M 10/0525; H01M 2010/4271; H01M 4/808; H01M 4/661; H01M 2220/30; H01M 4/366
See application file for complete search history.

(56) References Cited

U.S. PATENT DOCUMENTS

| | | | |
|---|---|---|---|
| 6,451,472 B1 * | 9/2002 | Chang | H01M 4/131 29/623.2 |
| 2002/0106561 A1 * | 8/2002 | Lee | H01M 4/5815 429/218.1 |
| 2004/0161640 A1 | 8/2004 | Salot | |
| 2004/0214079 A1 | 10/2004 | Simburger et al. | |

(Continued)

FOREIGN PATENT DOCUMENTS

JP  2000285881  * 10/2000

OTHER PUBLICATIONS

PCT/US2016/059431, International Search Report and Written Opinion, dated Feb. 15, 2017, 13 pages.

*Primary Examiner* — Ula C Ruddock
*Assistant Examiner* — Matthew W Van Oudenaren
(74) *Attorney, Agent, or Firm* — Stoel Rives LLP (57) ABSTRACT

A battery cell is formed to efficiently use unoccupied space in an electronic device. The battery cell may be formed by disposing an electrically insulating material on at least a first surface of a circuit board having components to create an electrical barrier and disposing a battery cell on the electrically insulating material. In some embodiments, a portion of the battery cell is configured to be partially disposed between components of the circuit board components, thus utilizing previously unoccupied space in the electronic device to store energy.

8 Claims, 6 Drawing Sheets

(56) References Cited

U.S. PATENT DOCUMENTS

2005/0189139 A1* 9/2005 Stole .................. H01M 2/0275
                                                              174/260
2010/0151282 A1    6/2010  Koh et al.
2011/0165452 A1    7/2011  Ahn
2014/0295246 A1   10/2014  Johnson

* cited by examiner

VOID FILLING BATTERY

TECHNICAL FIELD

This disclosure relates to batteries, and more particularly to batteries integrated with electronic devices having limited space.

BACKGROUND

Electronic devices, including wearable technology and mobile platforms such as smartphones, laptops, notebook computers, and tablet computers, continue to shrink in size. A power delivery system, including one or more battery cells, is often among the largest components of a portable electronic device. For portable electronic devices to shrink in size, power delivery systems would benefit from efficiently using space provided in the electronic device.

BRIEF DESCRIPTION OF THE DRAWINGS

Arrangements and embodiments may be described in detail with reference to the following drawings, in which like reference numerals refer to like elements, and wherein.

DETAILED DESCRIPTION OF EMBODIMENTS

Embodiments and arrangements disclosed herein include a battery cell ("battery") configured to fill voids of an electronic device. In certain embodiments, the battery cell is disposed onto a circuit board of an electronic device, filling at least some voids between circuit board components. In some of these embodiments, disposing the battery onto the circuit board and between circuit board components allows for a more compact device design than an alternate design with a battery separated from the circuit board of the electronic device.

In the embodiments discussed, it should be understood that other components of a battery and electronic device may be added to the disclosed elements of the battery cell and/or device including electrolytes and one or more loads. Also, the term "active material" denotes the active material comprised in one or more of anode active material and cathode active material.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of the disclosed embodiments. The same reference numerals in different figures denote the same elements, while similar reference numerals may, but do not necessarily, denote similar elements.

The terms "first," "second," and the like in the description and in the claims are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of actions, the order of such actions as presented herein is not necessarily the only order in which such actions may be performed, and certain of the stated actions may possibly be omitted, and/or certain other actions not described herein may possibly be added to the method. Furthermore, the terms "comprise," "include," "have," and any variations thereof are intended to cover a non-exclusive inclusion, such that a process, method, article, or apparatus that comprises a list of elements is not necessarily limited to those elements, but may include other elements not expressly listed or inherent to such process, method, article, or apparatus.

The terms "outwardly," "onto," "adjacent," and the like in the description and in the claims are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in some embodiments," "in other embodiments," and "in further embodiments" herein do not necessarily indicate mutual exclusivity.

Figure 1:
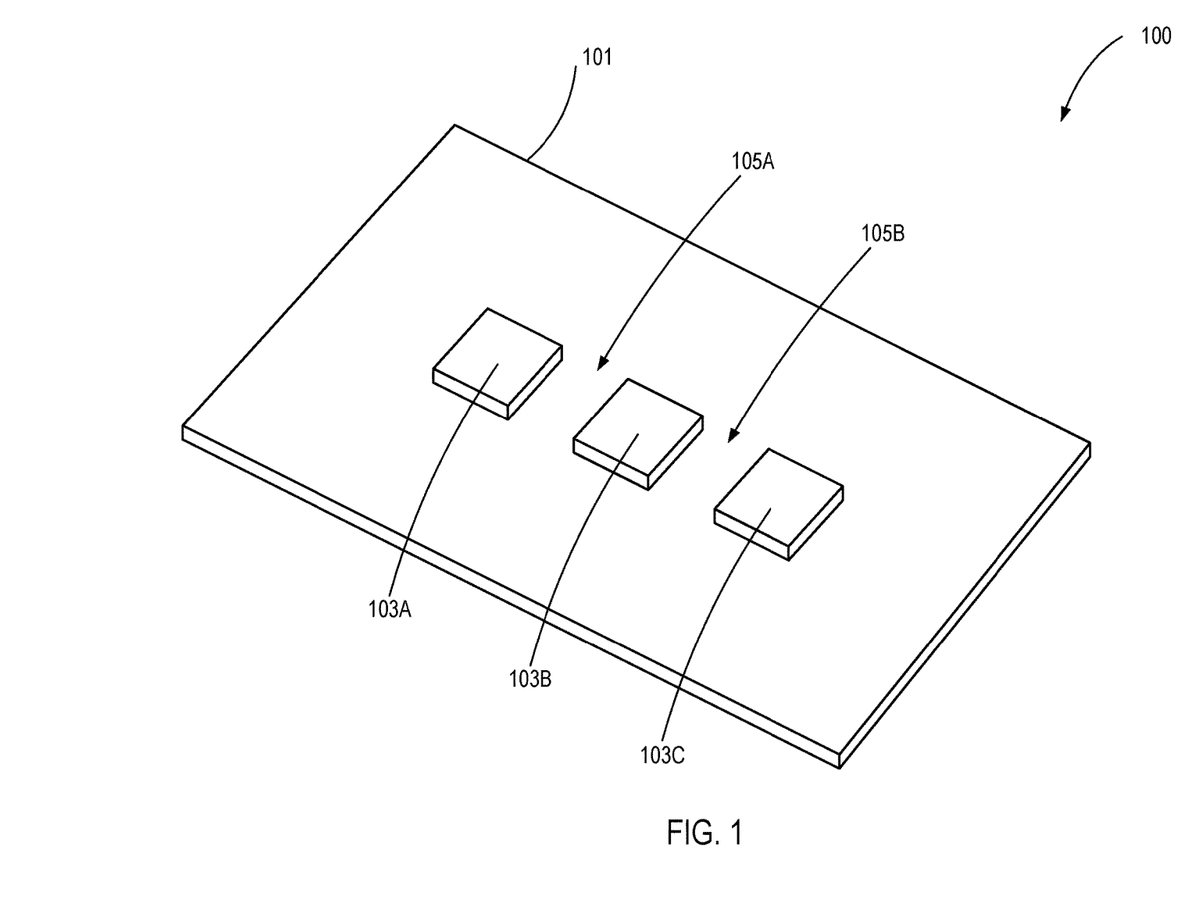
FIG. 1 is a perspective view of a circuit board.

FIG. 1 is a perspective view of a circuit board 100 comprising a wafer 101 and circuit board components 103A, 103B, and 103C. The circuit board components 103A, 1036, and 103C extend outwardly from a first side of the wafer 101, creating a void 105A between the circuit board components 103A and 103B and a void 105B between the circuit board components 103B and 103C. In some embodiments, the wafer 101 comprises silicon. The circuit board components 103A, 103B, and 103C may comprise one or more circuit board components including, but not limited to, a processor, another battery cell, a capacitor, a switch, a fuse, a resistor, a bridge, an RF interface IC, a transceiver, a power amp, a PMIC unit, a communication chip, structural supports, and other known circuit board components. The circuit board components 103A, 103B, and 103C may be any size and shape. In other embodiments of the circuit board, any number of circuit board components are comprised in the circuit board, forming one or more voids. It is within the scope of this disclosure for a circuit board to have a single circuit board component with one void surrounding the one circuit board component on two or more sides.

Figure 2:
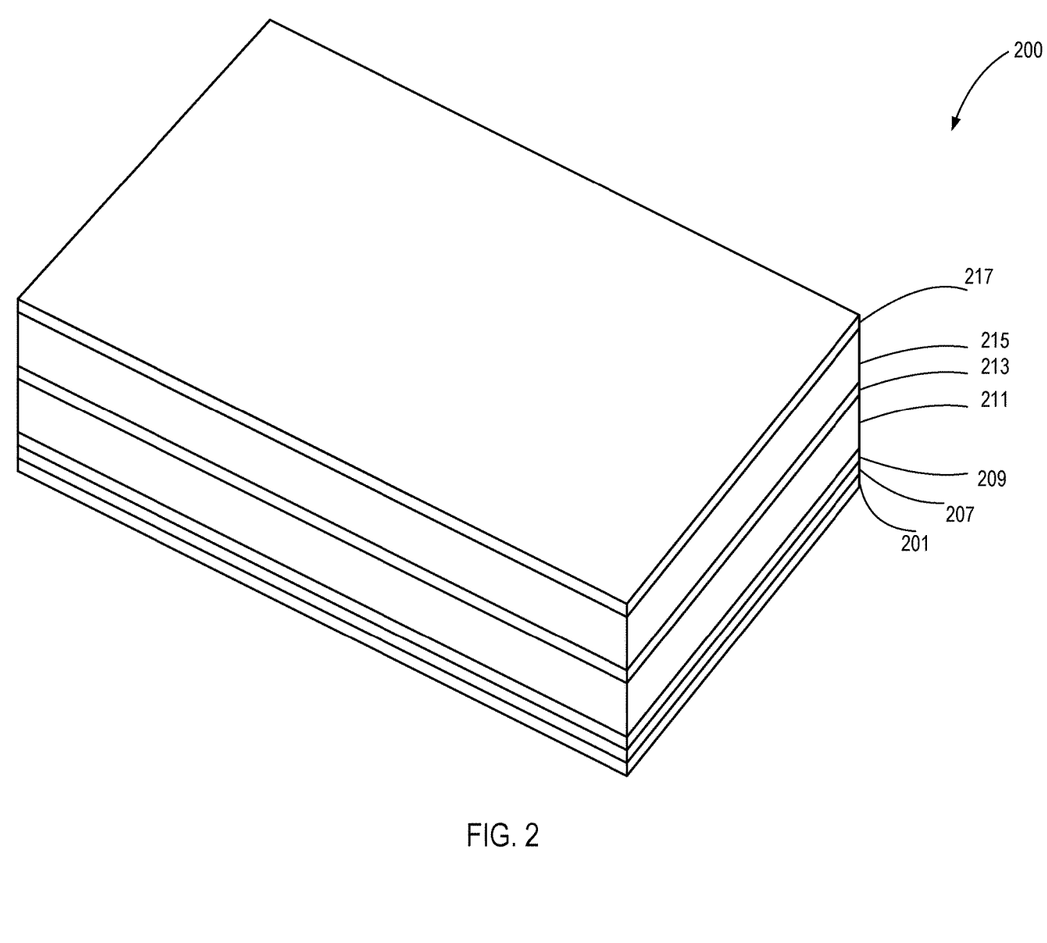
FIG. 2 illustrates a void-filling battery system extending outwardly from a circuit board.

FIG. 2 is a perspective view of a void-filling battery system 200 extending outwardly from a circuit board comprising a wafer 201, an electrically insulating material 207, and a battery cell comprising a first current collector 209, a first active material 211, a separator 213, a second active material 215, and a second current collector 217. The wafer 201 may be comprised in a circuit board that also comprises one or more circuit board components (not shown). The electrically insulating material 207 may be layered onto the wafer 201 by immersing at least one side in a fluid form of the electrically insulating material 207. In other embodiments, the electrically insulating material 207 may be layered onto the wafer 201 using an application process similar to painting. In other embodiments, the electrically insulating material 207 may be integrally formed with the battery cell before placing the battery cell on the wafer 201.

In some embodiments, the first current collector 209 may be flame-sprayed onto the insulating material 207, attached using adhesive, or placed upon the insulating material 207. In some embodiments, the first current collector 209 forms a layer that completely covers an outward surface (top) of the insulating material 207. In other embodiments, the first current collector 209 forms a layer that only partially covers the outward surface of the insulating material 207. In some embodiments, the first current collector 209 may comprise an electrically conductive material such as one or more of copper, aluminum, nickel, or another suitable material.

In the illustrated embodiment, the first active material 211 is disposed on an outward surface of the first current collector 209. In the embodiments wherein the first current collector 209 forms a layer that only partially covers the outward surface of the insulating material 207, the first active material 211 may also be in direct contact with the insulating material 207. Collectively, the first active material 211 and the first current collector 209 form a first electrode. In some embodiments, the first electrode comprises a cathode. In other embodiments, the first electrode comprises an anode. The first active material may comprise one or more of lithium cobalt oxide ($LiCoO_2$), other lithium compounds, magnesium compounds, copper compounds, and tin compounds. The first active material 211 may also comprise a conductive additive to increase lateral conductivity, such as carbon nano-tube structures.

In the illustrated embodiment, the separator 213 is disposed between the first active material 211 and the second active material 215 to prevent electrical conduction. The separator 213 may comprise a microporous polymer separator or other material that allows lithium ions to pass (but not electrons) during charging and discharging of the battery cell. In some embodiments, the separator 213 comprises a solid-state electrolyte. In other embodiments, the battery system comprises an electrolyte material to permeate the first active material 211 and the second active material 215 and transport ionic charge through the separator 213.

In the illustrated embodiment, the second active material 215 is disposed outwardly onto the separator 213. In some embodiments, the second active material 215 may comprise cathode material. In other embodiments, the second active material 215 may comprise anode material. The second active material 215 may comprise one or more of lithium cobalt oxide ($LiCoO_2$), other lithium compounds, magnesium compounds, copper compounds, and tin compounds. The second active material 215 may also comprise a conductive additive to increase lateral conductivity, such as carbon nano-tube structures.

In the illustrated embodiments, the second current collector 217 is disposed outwardly onto the second active material 215. The second current collector 217 may comprise an electrically conductive material such as one or more of copper, aluminum, nickel, or another suitable material.

In some embodiments wherein the wafer 201 is comprised in a circuit board, the circuit board produces heat that may cause damage to circuit board components (not shown) if not removed from the circuit board. The illustrated embodiment may remove some heat from the circuit board through thermal conductance.

The battery cell 200 may also comprise solid electrolyte material to negate the need to fill the battery cell 200 with a liquid electrolyte. In some embodiments, the battery cell 200 comprises electrolytes or semi-solid electrode material that does not require hydrogen to be removed during manufacturing of the battery. In some of these embodiments, the electrode material may be thicker than 100 micrometers because it is semi-solid.

Persons skilled in the art will recognize from the disclosure herein that other materials may be used for the insulating material 207, the first current collector 209, the first active material 211, the separator 213, the second active material 215, and the second current collector 217.

Figure 3:
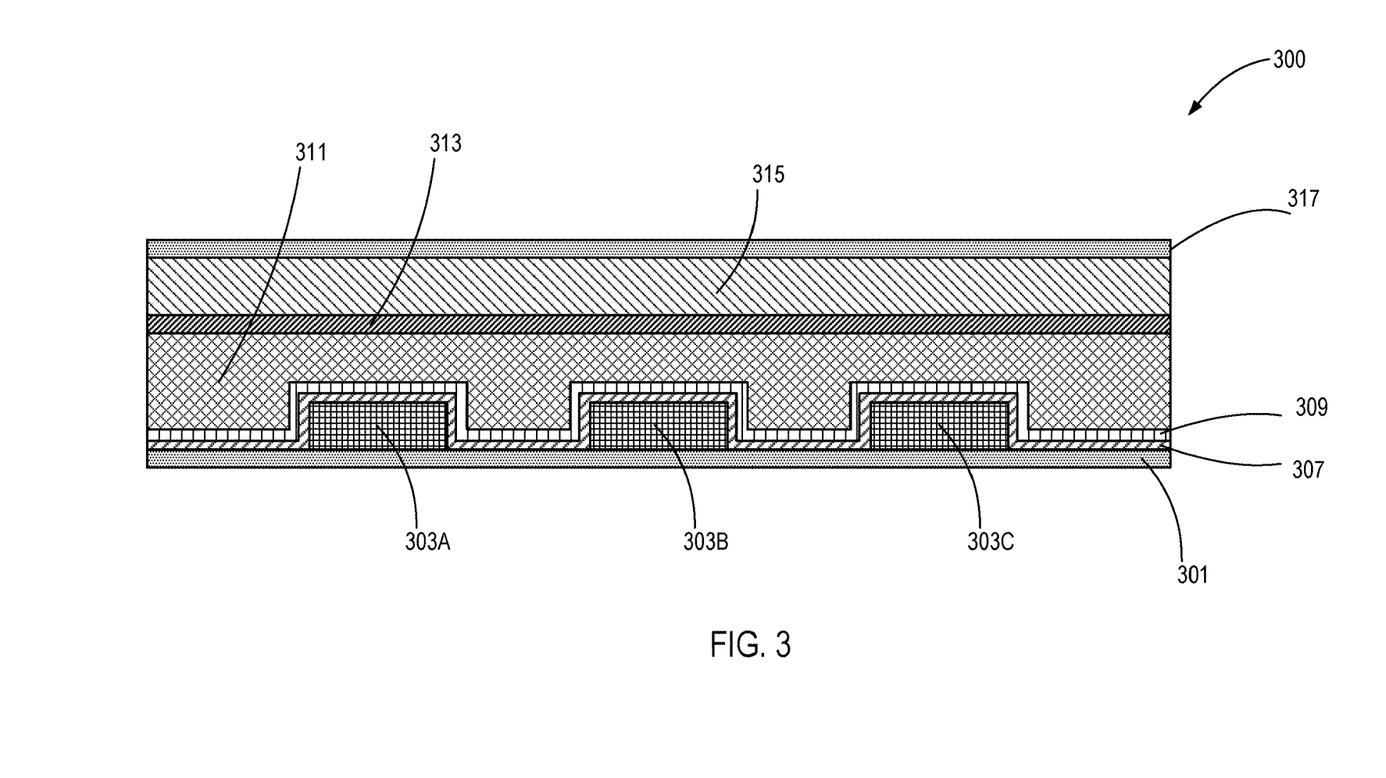
FIG. 3 is a cross-section of the void-filling battery system of FIG. 2.

FIG. 3 illustrates a cross-sectional view of another embodiment 300 of the void-filling battery system of FIG. 2, comprising a wafer 301; circuit board components 303A, 303B, 303C; an insulating layer 307; a first current collector 309; a first active material 311; a separator 313; a second active material 315; and a second current collector 317. The wafer 301 and circuit board components 303A, 303B, 303C are comprised in a circuit board. In the illustrated embodiment, the separator 313 is planar and continuous. The separator 313 may be entirely disposed outwardly from each circuit board component 303A, 303B, 303C. In other embodiments, the separator 313 is not planar and/or not continuous.

Figure 4:
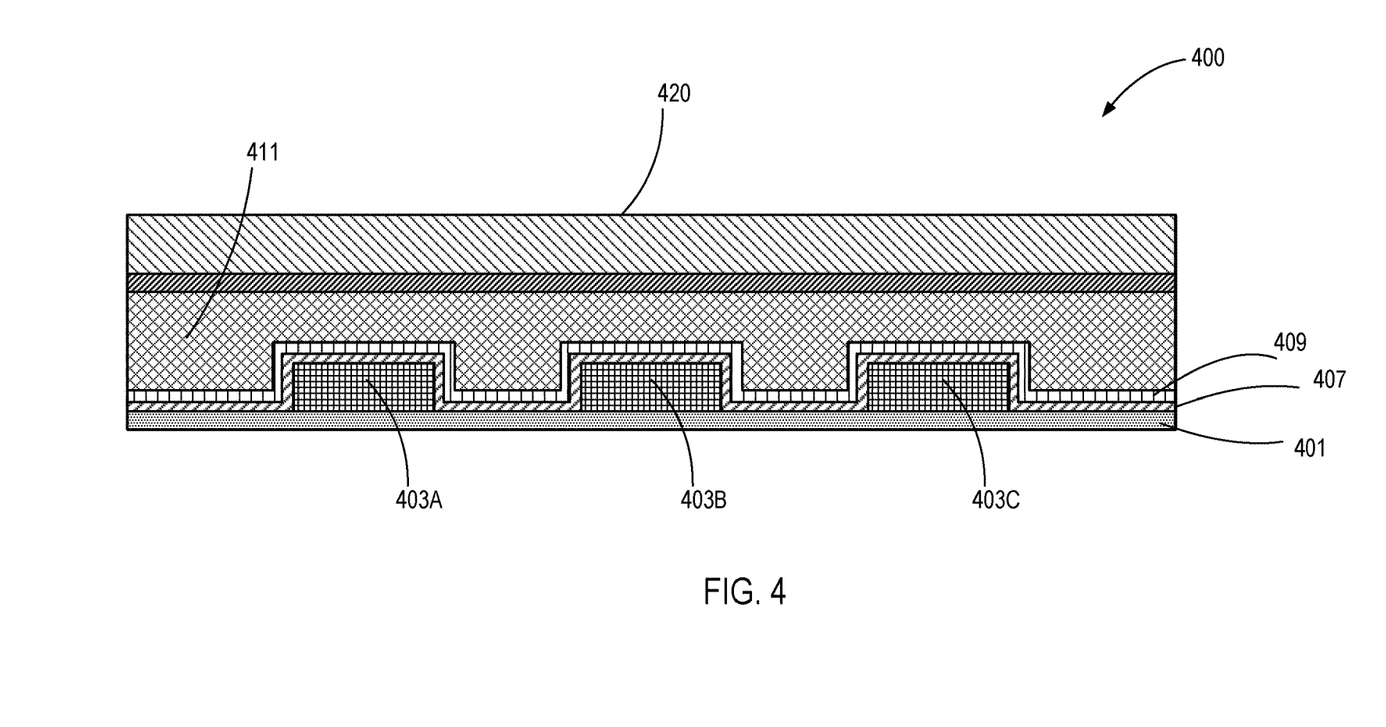
FIG. 4 is a cross-sectional view of another embodiment of the void-filling battery system of FIG. 2.

FIG. 4 illustrates a cross-sectional view of another embodiment 400 of the void-filling battery system of FIG. 2 comprising a wafer 401; circuit board components 403A, 403B, 403C; an insulating layer 407; a first electrode comprising a first current collector 409 and a first active material 411; and a second electrode 420 comprising a metal foam current collector, a second active material, and a separator. In the illustrated embodiment 400, the second active material is disposed within pores of the metal foam so that the second active material is electrically coupled to the metal foam. The separator is disposed on the surfaces of the metal foam and second active material to create an electrical barrier between the first active material 411 and the second electrode 420. In the illustrated embodiment, the separator is disposed in the pores of the metal foam. In other embodiments, the separator is disposed on the inward (bottom) surface of the second electrode 420. In some embodiments, the separator is layered onto one or more of the metal foam and second active material by immersing the metal foam and/or second active material in a fluid form of the separator material. Embodiment 400 may incorporate the characteristics and design of metal foam battery cells such as those disclosed in U.S. patent application Ser. No. 14/865,109 of Matsumura et al.

Figure 5:
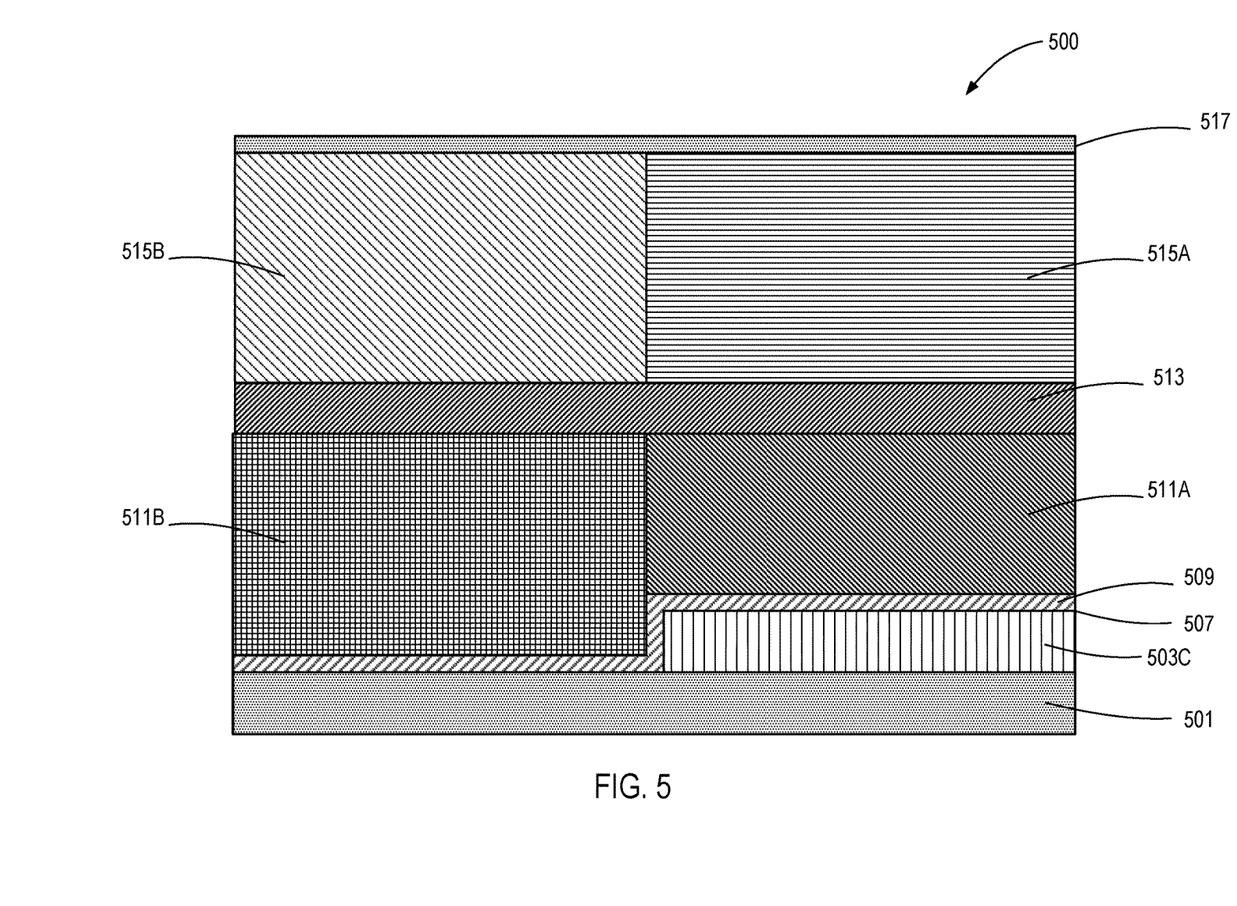
FIG. 5 is a cross-sectional view of another embodiment of the void-filling battery system of FIG. 2.

FIG. 5 illustrates a cross-sectional view of another embodiment 500 of the void-filling battery system of FIG. 2, comprising a wafer 501; a circuit board component 503C; an insulating layer 507; a first current collector 509; a first zone 511A of a first active material; a second zone 511B of the first active material; a separator 513; a first zone 515A of a second active material; a second zone 515B of the second active material; and a second current collector 517. The wafer 501 and the circuit board component 503C may be comprised in a circuit board. In the illustrated embodiment 500, the first zone 511A of the first active material is thinner (or less thick) than the second zone 511B of the first active material because it is positioned outwardly from an object on the wafer 501 (in the illustrated embodiment 500, circuit board component 503C). The thickness of a zone of the first active material may be defined as the distance measured orthogonally from the plane of the wafer of the circuit board between the circuit board adjacent to the zone and the separator adjacent to the zone.

The first zone 511A of the first active material may be a volume of the first active material defined by the thickness and width shown in FIG. 5 and a length (not shown) extending the length of circuit board component 503C. Thus, the volume of the first zone 511A of the first active material is the volume of the first active material positioned between the circuit board component 503C and the separator 513 directly above (or adjacent to) the circuit board component 503C. The second zone 511B of the first active material is the volume of the first active material defined by the width and thickness shown in FIG. 5 and a length (not shown) extending a distance. In some embodiments, the length and width of the second zone 511B of the first active material form an area orthogonal to the cross-sectional view shown in FIG. 5 that is equal in size to the area of the first zone 511A of the first active material formed by its length and width. In these embodiments, the second zone 511B has a larger volume of the first active material than the first zone 511A. In some of these embodiments, the first active material is generally uniform across the first zone 511A of the first active material and the second zone 511B of the first active material, resulting in a higher energy capacity in the second zone 511B of the first active material than in the first zone 511A of the first active material.

In the embodiments 500 of the void-filling battery system wherein the second zone 511B of the first active material has a higher energy capacity than the first zone 511A of the first active material, the non-uniformity may cause localized battery stress in high power and/or rechargeable cells. This localized stress may occur when the variable thickness of the first active material causes a localized mismatch with the storage capacity of the second active material that is disposed outwardly from (on top of) various zones of the first active material. To avoid or reduce the localized stress, the second active material may be manipulated to reduce or avoid the mismatch of storage capacity between a zone of the first active material and a zone of the second active material disposed outwardly from (on top of) the zone of the first active material. As shown in FIG. 5, the first zone 515A of the second active material has been formed with different characteristics than those of the second zone 515B of the second active material. The different characteristics may include reducing a density of the first zone 515A of the second active material and/or increasing a density of the second zone 515B of the second active material to account for the lower energy storage capacity of the first zone 511A of the first active material. In other embodiments, one or more of the first zone 515A of the second active material and the second zone 515B of the second active material may be impregnated with an additive to decrease or increase the energy capacity of the first zone 515A of the second active material and/or second zone 515B of the second active material to account for the lower energy capacity of the first zone 511A of the first active material. In some embodiments, due to the manipulation of the second active material, the first zone 511A of the first active material and the first zone 515A of the second active material have similar energy capacities. In some of these embodiments, the energy capacity of the first zone 511A of the first active material is within 50% of the energy capacity of the first zone 515A of the second active material. In further embodiments, the first zone 511A of the first active material is within 25% of the energy capacity of the first zone 515A of the second active material. In still further embodiments, the first zone 511A of the first active material is within 20% of the energy capacity of the first zone 515A of the second active material. In still further embodiments, the first zone 511A of the first active material is within 10% of the energy capacity of the first zone 515A of the second active material.

In some embodiments, a plurality of zones of the first active material having variable energy capacities are identified. In some of these embodiments, one or more corresponding zones of the second active material are manipulated to have similar capacities as the corresponding zone of the first active material, above which the one or more corresponding zones of the second active material are disposed.

In other embodiments, a mismatch of energy capacity between one or more zones of the first active material and one or more zones of the second active material may be remedied using a charger integrated circuit or other processor to execute computer code to control the maximum rate of charge that may be conducted during charging and/or discharging to allow ions involved in the charging and/or discharging to move vertically and/or laterally within the active material to create a generally uniform charge level in the active material independent of the thickness of the material. In some embodiments, the lateral conductivity may be improved by impregnating the active material with conductive additives such as carbon nano-tubes to allow for an increase in the maximum rate of charge allowed.

Figure 6A:
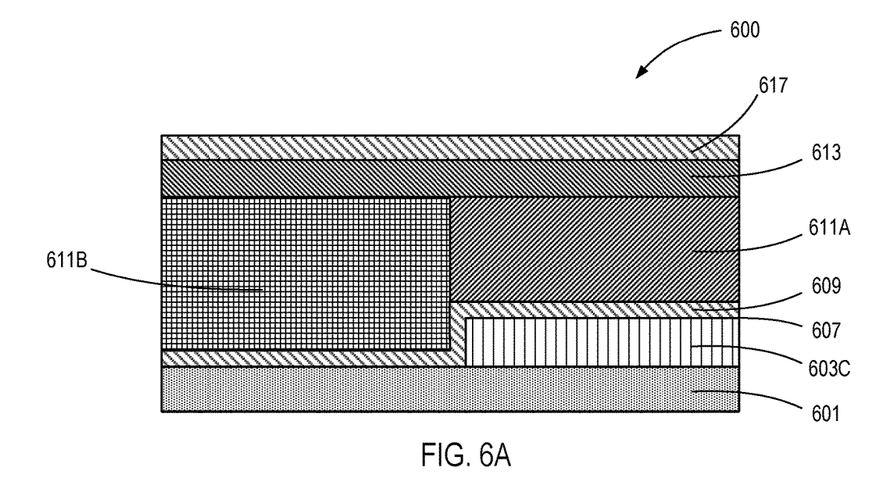
FIG. 6A is a cross-sectional view of another embodiment of the void-filling battery system of FIG. 2 in a fully discharged state.
Figure 6B:
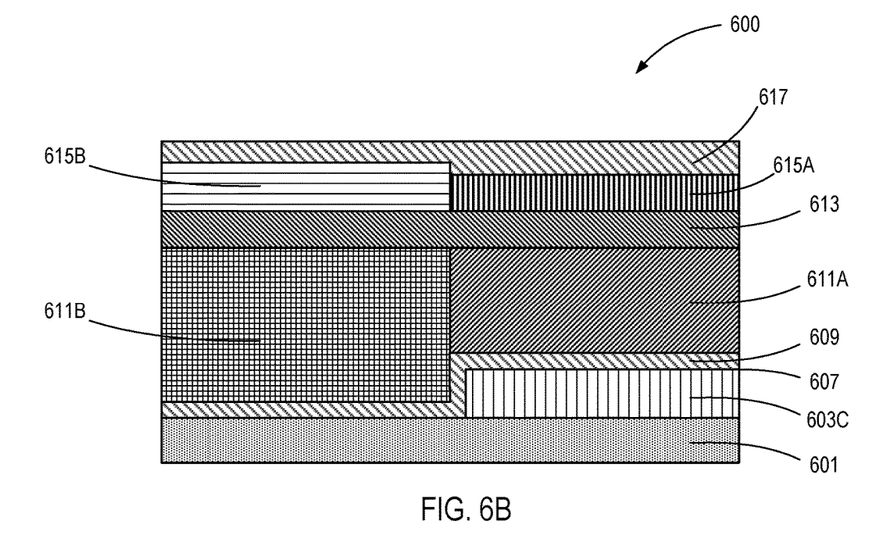
FIG. 6B illustrates a cross-sectional view of the embodiment of FIG. 6A in a charged state.

Collectively, FIG. 6A and FIG. 6B illustrate cross-sectional views of another embodiment 600 of the void-filling battery system of FIG. 2, wherein the battery cell is a lithium-metal battery cell comprising a wafer 601; a circuit board component 603C; an insulating layer 607; a first current collector 609; a first zone 611A of a first active material; a second zone 611B of the first active material; a separator 613; and a second current collector 617. The wafer 601 and the circuit board component 603C are comprised in a circuit board. FIG. 6A shows the embodiment 600 of the void-filling battery system in a fully discharged state, wherein the second active material is not present in at least a portion of the battery cell. FIG. 6B shows the embodiment 600 of the void filling battery cell in a charged state, wherein a first zone 615A of a second active material and a second zone 615B of the second active material have "grown" as lithium metal is deposited during charging to form an anode for the battery cell.

It should be understood that other types of batteries wherein an active material "grows" during charging or discharging are also within the scope of this disclosure. For example, other metal rechargeable battery cells may be used in place of the lithium-metal battery described. In some metal rechargeable battery cells, a thickness of an anode layer is reduced in the metal rechargeable battery cell by removing a graphite structure commonly used to store lithium ions and allowing the lithium to form instead as a thin metal film. For example, an anode may be formed on an anode current collector when the metal rechargeable battery cell is charged. This allows for a thinner battery with higher energy density that may be formed in a process that reduces or eliminates a mismatch of storage capacity between a cathode material and an anode material adjacent to the cathode material, particularly in battery cells wherein the cathode material has a variable or non-uniform thickness.

EXAMPLE EMBODIMENTS

The following are examples of further embodiments. Examples may include subject matter such as a battery, a device, a method, a means for performing acts of the method, or at least one machine-readable medium including instructions that, when performed by a machine, cause the machine to perform acts of the method according to the embodiments and examples described herein.

Example 1 is a battery system. The battery systems include an electrically insulating material and a battery cell attached to the electrically insulating material. The electrically insulating material is placed on a portion of a circuit board surface. The circuit board includes a variety of circuit board components extending outwardly from the surface of the circuit board and forming a series of voids between the circuit board components. The battery cell is attached to the electrically insulating material which creates an electrical barrier between the battery cell and the surface of the circuit board. The portion of the battery cell is designed to be at least partially placed in two or more voids between the circuit board components, and includes a first current collector including an electrically conductive material, a cathode material electrically attached to the first current collector, a separator, an anode material separated from the cathode material by the separator, and a second current collector electrically attached to the anode material.

Example 2 includes the battery system of Example 1, where the electrically insulating material is placed on at least the surface of the circuit board by immersing the circuit board in a liquid form of the electrically insulating material.

Example 3 includes the battery system of Example 1, where the circuit board is a component of a mobile electronic device.

Example 4 includes the battery system of Example 1, where the first current collector includes a metal material that is flame-sprayed onto the electrically insulating material.

Example 5 includes the battery system of Example 1, where a portion of one of the cathode material and anode material is in direct contact with a portion of the electrically insulating material.

Example 6 includes the battery system of any of Examples 1-5, where the portion of the battery cell designed to be partially placed in two or more of the voids between the circuit board components includes a portion of one or more of the cathode material and the anode material.

Example 7 includes the battery system of any of Examples 1-5, where one or more of the first current collector and the second current collector contain a metal foam comprising pores, and where one of the cathode material or the anode material is partially placed in the pores.

Example 8 is also a battery system. This battery system includes an electrically insulating material and a battery cell. The electrically insulating material is placed on a first surface of a circuit board which creates an electrical barrier on the surface of the circuit board. The circuit board includes a variety of circuit board components extending outwardly from the first surface of the circuit board forming a series of voids between the circuit board components. The battery cell is attached to the electrically insulating material. The portion of the battery cell is designed to be partially placed outwardly from at least one circuit board component and at least partially placed in one or more of the variety of voids between the circuit board components. The battery cell includes a first current collector containing an electrically conductive material, a first active material electrically attached to the first current collector, a separator, a second active material separated from the first active material by the separator, and a second current collector electrically attached to the second active material.

Example 9 includes the battery system of Example 8, where the second active material contains a series of zones, and where one or more of the zones contain material at a density distinct from at least one other zone.

Example 10 includes the battery system of Example 9, where the series of zones of the second active material are arranged such that a density of a zone is inversely proportional to an average thickness of a corresponding zone of the first active material positioned directly between the zone of the series of zones of the second active material and the electrically insulating material.

Example 11 includes the battery system of Example 9, where an energy capacity of the series of zones of the second active material is within 20% of the capacity of a corresponding zone of the first active material positioned directly between the zone zones of the second active material and the electrically insulating material.

Example 12 includes the battery system of any of Examples 8-11, where one or more of the first active material and the second active material includes a conductive additive to increase lateral conductivity.

Example 13 includes the battery system of any of Examples 8-11, where the conductive additive includes carbon nano-tube structures.

Example 14 includes the battery system of any of Examples 8-11, where the second active material decreases in volume during discharging of the battery cell and increases in volume during charging of the battery cell.

Example 15 includes the battery system of any of Examples 8-11, where the second current collector comprises a metal foam having pores, the pores being at least partially filled with one of the first active material and the second active material.

Example 16 includes the battery system of Example 15, where the separator is placed on a portion of the metal foam to prevent electrical conduction between the first active material and the second active material.

Example 17 includes the battery system of Example 15, where the first active material contains a cathode or an anode, and where the second active material contains the other cathode or an anode.

Example 18 includes the battery system of any of Examples 8-11, further containing a processor to control one or more rates of charge and a rate of discharge of the battery system to facilitate a uniform charge level in the first active material and the second active material, where the first active material and the second active material have a variable thickness.

Example 19 is a method of manufacturing a battery system. The method of manufacturing a battery system includes providing an electrically insulating material on a first surface of a circuit board, providing a first current collector on at least a portion of the electrically insulating material, providing a first current collector on at least a portion of the electrically insulating material, providing a first active material on at least a portion of the first current collector, providing a separator on the first active material, providing a second active material on at least a portion of the separator, and providing a second current collector on at least a portion of the second active material. The circuit board contains a wafer and a variety of circuit board components protruding outwardly from the first surface of the circuit board forming a series of lateral voids between circuit board components.

Example 20 includes the method of Example 19, where providing an electrically insulating material on a first surface of a circuit board involves submersing the circuit board into the electrically insulating material.

Example 21 includes the method of Example 19, where the battery system transfers heat away from the circuit board through thermal conduction.

Example 22 includes the method of Example 19, where the separator comprises a solid electrolyte material.

Example 23 includes the method of Example 19, where providing the second active material includes identifying a first series of zones of the first active material, where at least one zone contains active material having a least thickness of the first variety of zones, the thickness of a zone being the distance measured orthogonally from the plane of the wafer of the circuit board between the circuit board adjacent to the zone and the separator adjacent to the zone, identifying a second variety of zones of the second active material, where at least one zone of the second variety of zones contains active material having a lowest density of the second series of zones, and placing at least one zone of the first series of zones adjacent to at least one zone of the second series of zones.

Example 24 includes the method of Example 19, where providing the second active material includes identifying an energy capacity of a variety of zones of the first active material, where each zone of the first active material is defined as a volume of the first active material extending directly outwardly from a circuit board component to the separator, identifying one or more corresponding zones of the second active material to pair with one or more corresponding zones of the first active material, where a corresponding zone of the second active material comprises an energy capacity being within 20% of the energy capacity of the paired corresponding zone of the first active material, and placing one or more corresponding zones of the second active material directly outwardly from the corresponding zones of the first active material.

Example 25 includes the method of Example 24, where one or more corresponding zones of the second active material have a density distinct from at least one other zone of the second active material.

Example 26 is a means for implementing a method as shown in any of Examples 19-25.

Various embodiments may be implemented using hardware elements, software elements, and/or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

One or more aspects of at least one embodiment may be implemented by representative instructions stored on a machine-readable medium which represents various logic within the processor, which when read by a machine causes the machine to fabricate logic to perform the techniques described herein. A machine-readable medium may include, for example, static random access memory (RAM), dynamic RAM, flash memory, one or more flip-flops, read only memory (ROM), compact disc ROM (CD-ROM), digital versatile disk (DVD), magnetic disk, magnetic tape, or other magnetic, optical, or solid state computer storage medium.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings, and the appended claims. In addition to variations and modifications in the component parts and/or arrangements, alternative uses will also be apparent to those skilled in the art. The scope of the present invention should, therefore, be determined only by the following claims.

The invention claimed is:

1. A battery system, comprising:
   an electrically insulating material disposed on at least a portion of a surface of a circuit board, wherein the circuit board comprises a plurality of circuit board components on the surface of the circuit board extending outwardly from the surface of the circuit board and forming a plurality of voids between the circuit board components, wherein the plurality of voids include unoccupied space at least partially bordered by sides of the plurality of circuit board components and the surface of the circuit board; and
   a battery cell coupled to the electrically insulating material, wherein the electrically insulating material creates an electrical barrier between the battery cell and the surface of the circuit board, wherein a portion of the battery cell is configured to be at least partially disposed in two or more of the plurality of voids between the circuit board components, such that the portion of the battery cell is at least partially between sides of the two or more of the plurality of circuit board components, the battery cell comprising:
      a first current collector comprising an electrically conductive material;
      a cathode material electrically coupled to the first current collector;
      a separator;
      an anode material separated from the cathode material by the separator; and
      a second current collector electrically coupled to the anode material.

2. The battery system of claim 1, wherein the electrically insulating material is disposed on at least the surface of the circuit board without completely filling the plurality of voids by immersing the circuit board in a liquid form of the electrically insulating material.

3. The battery system of claim 1, wherein the circuit board is a component of a mobile electronic device.

4. The battery system of claim 1, wherein the first current collector comprises a metal material that is flame-sprayed onto the electrically insulating material.

5. The battery system of claim 1, wherein a portion of one of the cathode material and anode material is in direct contact with a portion of the electrically insulating material.

6. The battery system of claim 1, wherein the portion of the battery cell configured to be at least partially disposed in two or more of the plurality of voids between the circuit board components comprises a portion of one or more of the cathode material and the anode material.

7. The battery system of claim 1, wherein one or more of the first current collector and the second current collector comprise a metal foam comprising pores, and wherein one of the cathode material or the anode material is at least partially disposed in the pores.

8. An electronic device, comprising:
- a circuit board comprising a surface;
- a plurality of circuit board components on the surface of the circuit board, wherein each of the plurality of circuit board components comprise a proximal portion on the circuit board and a distal portion outward from the circuit board, wherein the plurality of circuit board components form a plurality of voids between the circuit board components, wherein the plurality of voids include unoccupied space adjacent to sides of the plurality of circuit board components, the sides extending between the proximal portion and the distal portion;
- an electrically insulating material disposed on at least a portion of the surface of the circuit board and one or more of the plurality of circuit board components; and
- a battery cell coupled to the electrically insulating material, wherein the electrically insulating material creates an electrical barrier between the battery cell and the surface of the circuit board, wherein a portion of the battery cell is configured to be at least partially disposed in two or more of the plurality of voids between the circuit board components, such that the portion of the battery cell is adjacent to sides of the two or more of the plurality of circuit board components the battery cell comprising:
  - a first current collector comprising an electrically conductive material;
  - a cathode material electrically coupled to the first current collector;
  - a separator;
  - an anode material separated from the cathode material by the separator; and
  - a second current collector electrically coupled to the anode material.

* * * * *